United States Patent [19]
Bennett, III et al.

[11] Patent Number: 6,154,528
[45] Date of Patent: Nov. 28, 2000

[54] SYSTEM AND METHOD FOR STORING AND TRANSFERRING INFORMATION TOKENS IN A LOW NETWORK COMMUNICATION

[75] Inventors: Raymond Walden Bennett, III, Naperville; Karen Jeanne Pelletier, Crystal Lake; Laura Marie Griffith, Dundee; Michael Steven Pickard, Highland Park; Jordan Howard Light, Mt. Prospect; Robert Wesley Bossemeyer, Jr., St. Charles; Edmond W. Israelski, Lake Barrington; Bruce Edward Stuckman, Algonquin; Wayne Robert Heinmiller, Elgin, all of Ill.

[73] Assignee: Ameritech Corporation, Hoffman Estates, Ill.

[21] Appl. No.: 09/248,613

[22] Filed: Feb. 11, 1999

[51] Int. Cl.[7] .................................................. H04M 11/00
[52] U.S. Cl. ................................ 379/93.25; 379/90.01; 379/93.01
[58] Field of Search .......................... 379/90.01, 110.01, 379/91.01–93.08, 93.12, 93.28, 93.35, 93.25

[56] References Cited

U.S. PATENT DOCUMENTS

| | | | |
|---|---|---|---|
| 4,654,482 | 3/1987 | DeAngelis | 379/93.12 |
| 5,054,055 | 10/1991 | Hanle et al. | 379/142 |
| 5,341,414 | 8/1994 | Popke | 379/142 |
| 5,465,286 | 11/1995 | Clare et al. | 379/34 |
| 5,521,966 | 5/1996 | Friedes et al. | 379/93.02 |
| 5,675,637 | 10/1997 | Szlam et al. | 379/142 |
| 5,684,872 | 11/1997 | Flockhart et al. | 379/266 |
| 5,694,459 | 12/1997 | Backaus et al. | 379/427 |
| 5,729,593 | 3/1998 | Baker et al. | 379/67 |
| 5,754,589 | 5/1998 | Maitra et al. | 379/93.28 |
| 5,757,904 | 5/1998 | Anderson | 379/265 |
| 5,822,416 | 10/1998 | Goodacre et al. | 379/142 |
| 5,825,869 | 10/1998 | Brooks et al. | 379/265 |
| 5,949,763 | 9/1999 | Lund | |
| 5,999,914 | 12/1999 | Blinn et al. | |

*Primary Examiner*—Wing F. Chan
*Attorney, Agent, or Firm*—Katten Muchin Zavis

[57] ABSTRACT

A system (10) and method (40) are provided permitting cookie files to be used with telephonic customer premises equipment (CPE) (12). The caller CPE (12) can be an intelligent telephone adapted to generate, store, transmit and receive cookie files. The cookie files can include information tokens describing a caller profile. The CPE (12) can provide a template cookie file upon request from a called party during a conversation between the caller and called party. The template file can then be transmitted to the called party and modified. The modified cookie file can then be returned to the caller CPE (12) for future use during subsequent calls to the called party. The cookie file can reduce the processing time of calls placed to automated dial-up service centers and also reduces its computer resources required by the service system.

20 Claims, 5 Drawing Sheets

SYSTEM AND METHOD FOR STORING AND TRANSFERRING INFORMATION TOKENS IN A LOW NETWORK COMMUNICATION

TECHNICAL FIELD OF THE INVENTION

The present invention relates generally to telecommunications, and in particular, to a method and system for passing information tokens to and from customer terminal equipment.

BACKGROUND OF THE INVENTION

Many organizations and businesses provide services and information using telephonic interactive voice response (IVR) and/or automated call distribution (ACD) systems. As is known in the art, these systems iterate a caller through a menu of voice prompts to gather information from the caller. Typically, the caller can enter the requested information by either spoken response or touch-tone dialing. In the case of an IVR system, the entered information is used to provide an automated service to the caller, such as the playback of pre-recorded information, or the automated sale of goods or services. In an ACD system, the caller information can be used to route the caller to a specific operator and/or to provide caller information to the operator prior to servicing the call. Although conventional IVR and ACD systems represent a significant improvement over manually-operated dial-up service centers, repeat callers often find the interactive menus to be tiresome and overly time-consuming. Specifically, on subsequent calls, repeat callers typically find themselves entering much of the same data entered during earlier calls, such as their names, addresses, phone numbers, and the like.

To overcome the problem of repetitive data entry, information service systems have been developed that store personalized information of individual callers. U.S. Pat. No. 5,694,459 discloses an information service system that stores personalized profiles for callers. The '459 system relies on a unique identifier received during call setup to automatically retrieve the caller's profile. The profile can include generic information about the caller, such as name, address, o r the like, as well as particular information about the caller's previous selection or use history. Accordingly, the pre-existing profiles can reduce call processing delays and eliminate redundant data entry for repeat callers.

However, the '459 system suffers a drawback in that it must store and maintain profiles for a multitude of callers. This not only requires substantial computer storage resources, but also presents a problem of maintaining the data integrity of the profiles. For example, a caller, having previously used the service, may move, causing a change in home address and phone number. This would require the service provider to update the caller's profile. As such, storing caller profiles within the service system can increase operating costs. Accordingly, there is a need for a method and system of providing an automated dial-up service that enjoys the benefits of caller profiles, but reduces the burden of maintaining and storing such profiles.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION

The present invention relates to interactive telecommunications services. To overcome the above described limitations of conventional telephonic service systems, the present invention uses a data file or "cookie" file in the context of the telephone service. A "cookie" file is essentially a computer-readable data file containing information tokens, which can represent caller information, preferences, or the like. A caller customer premises equipment (CPE), such as an intelligent telephone, can be adapted to store cookie files, create generic cookie templates, and transfer and receive cookie files to and from remote dial-up service systems. The remote service system can be likewise adapted to utilize caller cookie files.

A cookie file can contain generic information, such as the caller's name, home and/or business address, phone number, e-mail address, or the like. In addition, a cookie file can be created and stored for each particular remote service system. In such cases, each cookie file could include information pertaining only to the particular remote service, as well as the generic information normally included in the cookie template.

An advantage of a telephone service using cookie files is that repeat callers would not be subjected to manually re-entering data every time they call. Another advantage is that service providers would not be required to store and maintain caller profiles. A further advantage is that callers could easily update generic information in cookie files locally stored in the caller CPE.

Figure 1:
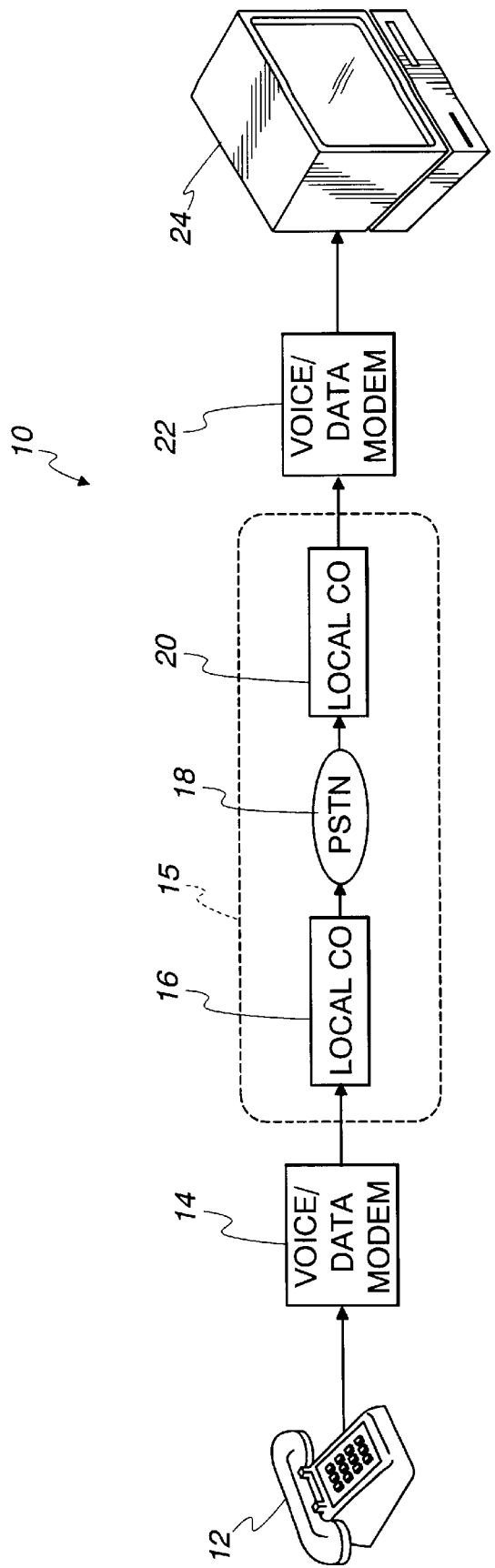
FIG. 1 is a block diagram illustrating a telecommunications system in accordance with an embodiment of the present invention.

Turning now to the drawings, and in particular to FIG. 1, there is illustrated a telecommunications system 10 in accordance with an embodiment of the present invention. The system 10 includes a caller CPE 12, a caller voice-over-data (VOD) modem 14, a telephone network 15, a called party CPE 24, and a called party VOD modem 22.

The telephone network 15 can include a public switched telephone network (PSTN) 18, a caller central office (CO)16 and a remote CO 20.

The caller CPE 12 can be any terminal device adapted to store, transmit and receive cookie files, such as an intelligent telephone, a video phone, a computer, or the like. An intelligent telephone is a terminal device that provides conventional telephony voice service in conjunction with computer-based functionality, such as the ability to transfer and internally store data files. The VOD modems 14, 22 permit voice and data from the CPEs 12, 24 to be simultaneously transferred over the telephone network 15.

The CPEs 12, 24 can communicate with the VOD modems 14, 22, respectively, using a standard interface, such as an RS-232 interface, a personal computer (PC) parallel port, a PC bus, a universal serial bus, or the like. The VOD modems 14, 22 can communicate with the COs 16, 20 using a conventional analog local-loop, an integrated services digital network (ISDN) interface, or the like. The modems 14, 22 can include conventional jacks or connectors for providing a detachable interface to the telephone network 15.

The VOD modems 14, 22 can be implemented using commercially-available VOD modems, such as the MRi-1456 advanced simultaneous voice-over-data (ASVD) modem, available from MRi (UK) Ltd., of Wembley, England. Such a modem can be connected to the CPEs 12 or 24 using a conventional peripheral components interface (PCI) bus.

The COs 16, 20 can be local exchange offices providing conventional telephone services, such as switching and call routing, to the caller and called party. The exchange offices 16, 20 can communicate via the PSTN 18.

The called party CPE 24 can be any telecommunications terminal device adapted to request and receive one or more cookie files from the caller CPE 12. In addition, according to one aspect of the invention, the CPE 24 can modify received cookie files by adding, changing, or deleting information tokens contained therein, and then returning the modified cookie files to the caller CPE 12.

An information token is a computer-usable representation of a piece of information. For example, a token can represent a name, address, number, letter, keystrokes, time, file name, software variable, or the like. A cookie file can include one or more information tokens.

The called CPE 24 can be a dial-up caller service system interfaced to the VOD modem 22 so that the service system can simultaneously transfer voice and data over the telephone network 15. For example, the service system can be a conventional personal computer (PC) or communications server including an MRi ASVD modem card, a conventional analog telephone card for providing phone service to an operator, and a software program for reading and writing cookie files to and from the caller CPE 12 via the VOD modems 14, 22 and the telephone network 15. The software program can also cause the service system to modify the cookie files, as well as store the received cookie files internally within the service system.

Figure 2:
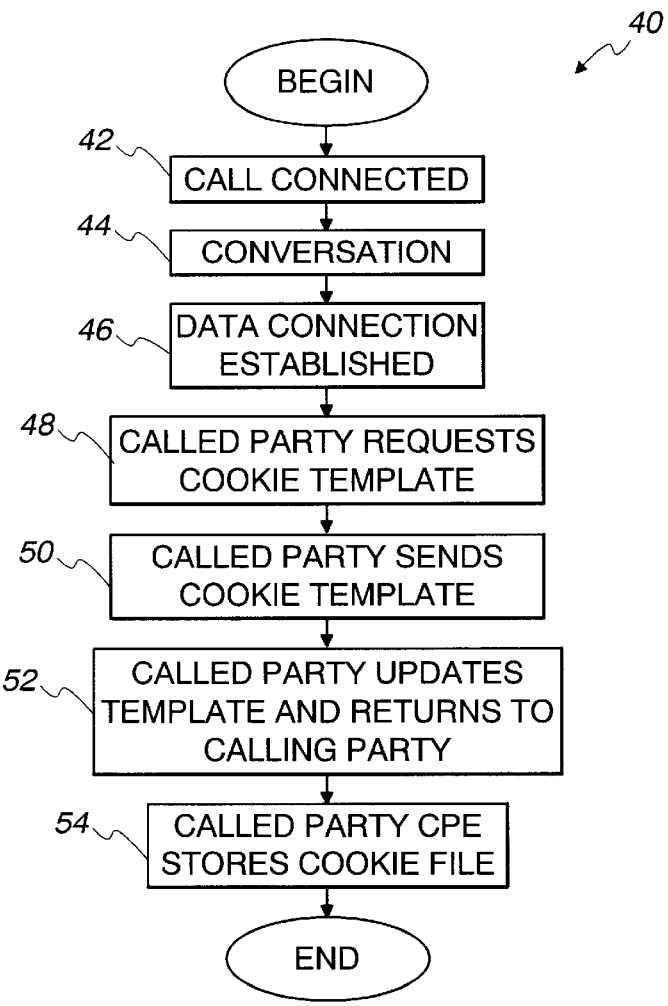
FIG. 2 is a flowchart diagram illustrating a method of operating the system of FIG. 1 in accordance with an embodiment of the present invention.

FIG. 2 shows a flowchart diagram of a method 40 of operating a system 10 in accordance with an embodiment of the present invention. In step 42, a call placed from the caller CPE 12 is connected to the called party CPE 24. The call is connected via the VOD modems 14, 22 and the telephone network 15.

In step 44, a conversation between CPE 12 and CPE 24 is established. The conversation can be a communications session between the caller and called party involving the transfer of voice and/or computer data between the CPEs 12, 24. Next, in step 46, a request is made by the called CPE 24 to establish a data connection for accessing cookie files stored on the caller CPE 12. The data connection can be established by a command issued from the called CPE 24 to its VOD modem 22, causing the VOD modem 22 to initiate a data transfer session with the caller VOD modem 14.

After establishing the data connection, the called party may request a cookie template (step 48). The request can be a digital instruction transmitted by the VOD modem 22 simultaneously with a voice conversation. Upon receiving the digital instruction, the caller CPE 12 would respond by generating and transmitting a cookie file template containing generic caller information (step 50).

In step 52, the called party can update the cookie template file with information specific to the service provided and return the updated cookie to the caller CPE 12. In step 54, the caller CPE 12 can store the cookie file internally.

During subsequent calls, the called CPE 24 can retrieve the updated cookie file from the CPE 12. This permits the caller to forego repeated entry of previously entered data or information tokens when subsequently calling the service provided by the CPE 24.

Figure 3:
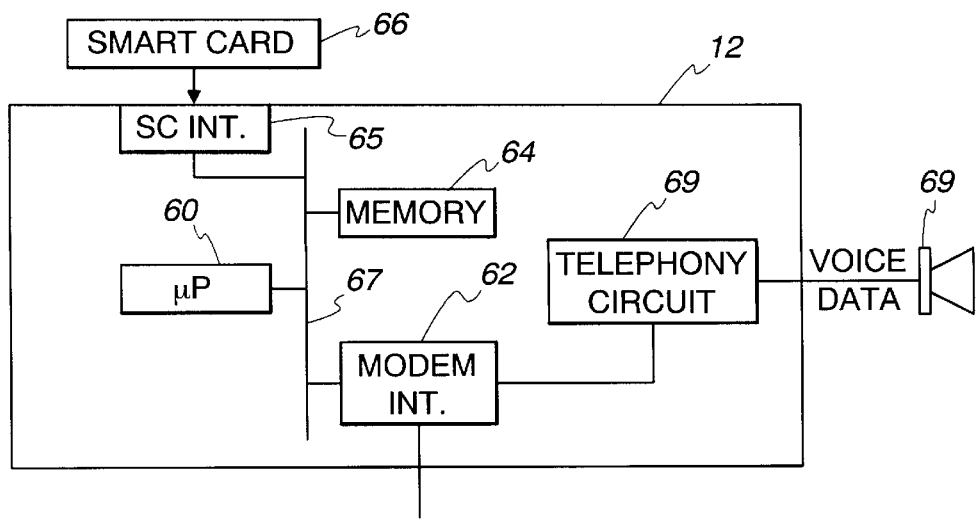
FIG. 3 is a detailed block diagram illustrating an exemplary embodiment of the caller customer premises equipment (CPE) shown in FIG. 1.

FIG. 3 shows a detailed block diagram of the caller CPE 12 of FIG. 1. The CPE 12 can include a microprocessor (uP) 60, a memory 64, a modem interface 62, a smartcard interface 64 and a bus 67. Also included in the CPE 12 is a telephony circuit 68 for providing conventional analog phone service.

The microprocessor 60 can be any microprocessor, microcontroller, or the like, such as one from the x86 family of microprocessors from Intel, Corp., or the PowerPC™ family of microprocessors from Motorola, Inc. The bus 67 can be a conventional microprocessor bus such as a peripheral component interface (PCI) bus, ISA bus, ESA bus, or the like. The memory 64 can be any type of computer memory, such as a random access memory (RAM), flash memory, hard drive, zip drive, floppy drive, or the like.

The modem interface 62 permits the CPE 12 to communicate with the VOD modem 14. Although the modem interface 62 is shown as being included in the CPE 12, one of ordinary skill in the art will readily understand that the modem interface 62 can be included in the VOD modem 14 itself, or alternatively, that the VOD modem 14 can be included internally within the CPE 12.

Cookie files can be stored in the memory 64, or alternatively, in an external memory, such as a smartcard 66. The smartcard 66 can be any commercially-available smartcard, contactless or contact, insertable into smartcard interface 65 of the CPE 12, such as a Multi-Function Card MCF/4K, from IBM Corporation. The smartcard interface 65 can include a commercially available smartcard reader, such as the GCI400 Smartcard Reader, from Gemplus, Corp. for reading ISO 7816 compliant smartcards. One of ordinary skill in the art will appreciate that the GCI400 can be readily configured to interface to a conventional microprocessor bus, such as the bus 67.

The telephony circuit 68 can include conventional circuitry for providing analog telephone service. Voice signals received from the local-loop interface are converted by the telephony circuit 68 for audible presentation to the caller. In addition, the circuit 68 can provide standard end device functions, such as ring detection and generation, dual-tone multi-frequency (DTMF) dialing, line termination, power supply conditioning, and the like. The telephony circuit 68 can include an ARCOFI Chip, Part No. PSB2163, manufactured by Siemens Corporation. In such an embodiment, the ARCOFI Chip can be readily interfaced to the microprocessor 60. The ARCOFI Chip also provides an interface to a standard loudspeaker 69.

The memory 64 can store a software program executable by the microprocessor 60 for providing the functionality of creating, storing, and transmitting cookie files.

Figure 4:
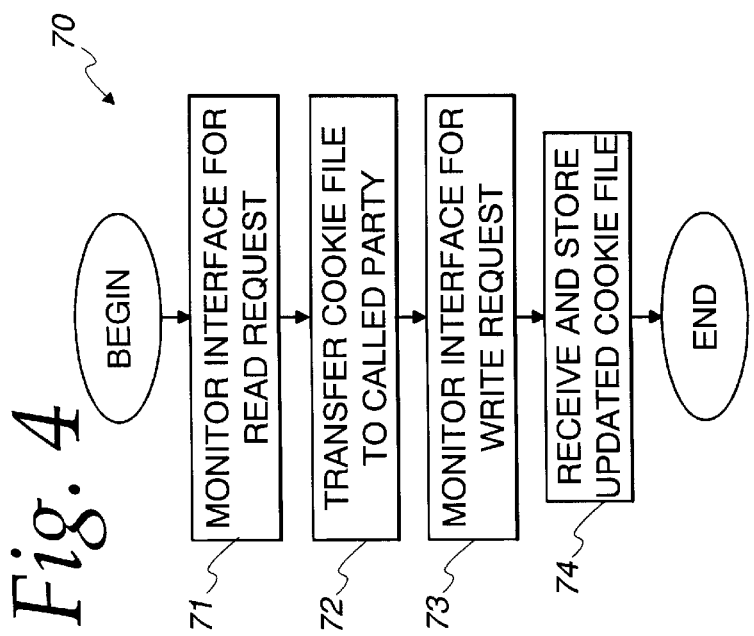
FIG. 4 is a flowchart diagram illustrating a method of operating the caller CPE of FIG. 3 in accordance with an embodiment of the present invention.

FIG. 4 illustrates a flowchart diagram 70 depicting the operation of the CPE 12 in accordance with an embodiment of the present invention. The method 70 can be implemented using computer instructions included in the above-mentioned software program routine executable by the microprocessor 60.

In step 71, the CPE 12 monitors the modem interface 62 for a cookie read-request transmitted by the called party CPE 24. The read-request can include an identifier corresponding to a particular cookie file or template stored in CPE 12. Upon receiving the read-request, the microprocessor 60 can retrieve the requested cookie file from either the smartcard 66 or memory 64 (step 72). The cookie file is then transferred via the telephone network 15 to the called CPE 24.

In step 73, the CPE 12 monitors the modem interface for a cookie file write-request. A write-request is transmitted by the called party CPE 24 indicating that it is ready to transmit a modified cookie file for storage in the caller CPE 12. In step 74, the CPE 12 receives and stores the modified cookie file. The cookie file is received by the CPE 12 at the modem interface 62. The microprocessor 60 causes the modem interface 62 to transfer the incoming cookie file via the bus 67 to either the smartcard storage 66 or the memory 64.

Figure 5:
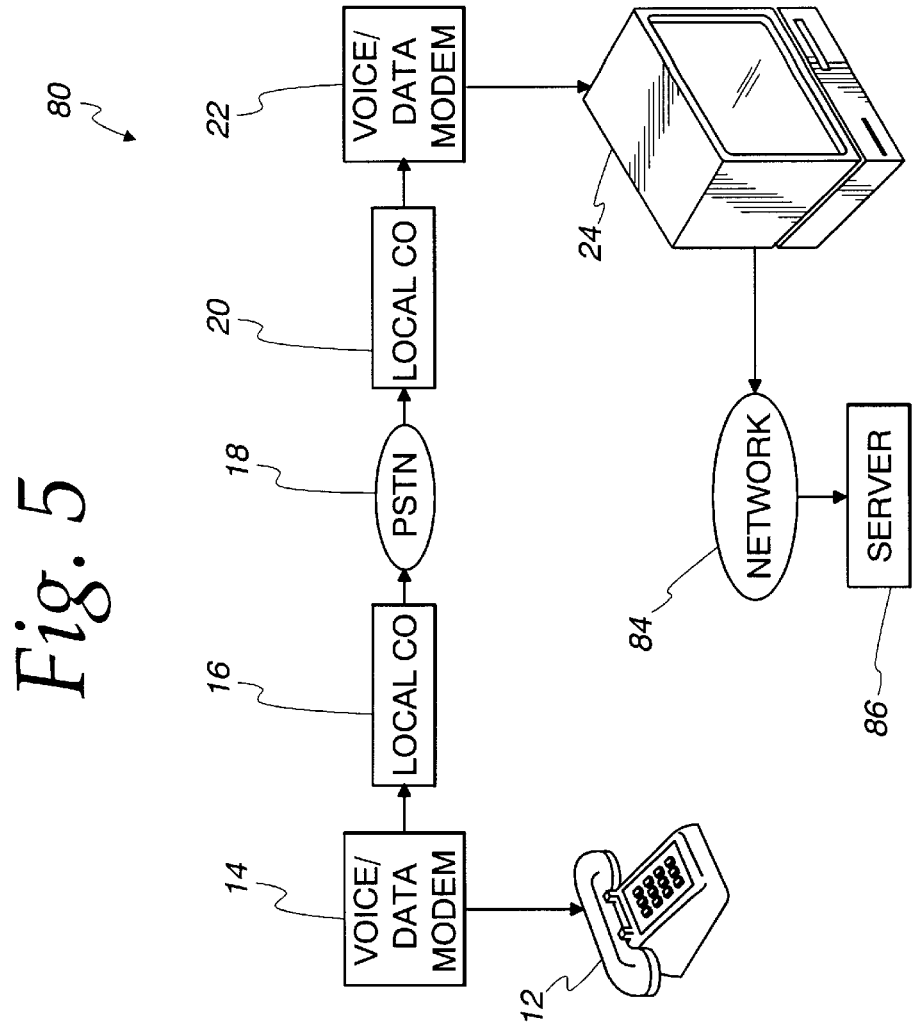
FIG. 5 is a block diagram illustrating a telecommunications system in accordance with another embodiment of the present invention.

FIG. 5 illustrates a telecommunications system 80 in accordance with an alternative embodiment of the present invention. In addition to the components shown in FIG. 1, the system 80 of FIG. 5 includes a server 86 communicating with the called party CPE 24 via a communication network 84. The server 86 can be a conventional personal computer (PC), or any other computer or communications server capable of storing cookie files. The network 84 can be a conventional local area (LAN) network, such as a TCP/IP-based communications network, Ethernet, Token Ring, or the like; or alternatively, a wide area network (WAN), such as the global Internet, an asynchronous transfer mode (ATM) network, SONET, or the like. Among other things, the cookie server 86 permits the CPE 24 to store backup copies of the caller cookie files for later use by the service provider.

Figure 6:
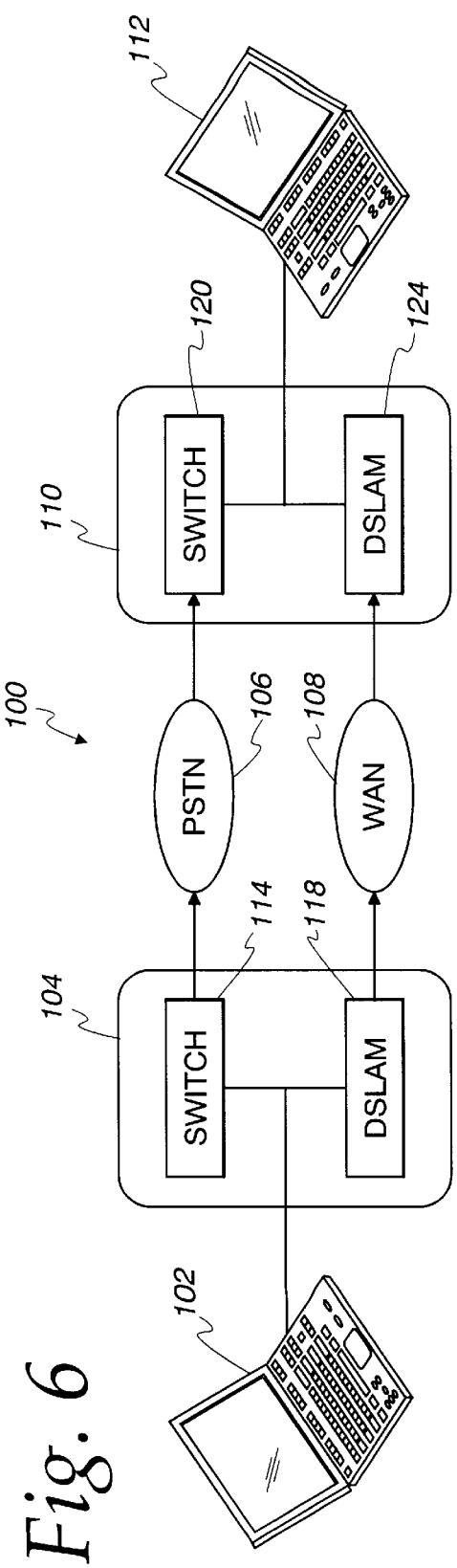
FIG. 6 is a block diagram illustrating a telecommunications system in accordance with a further embodiment of the present invention.

FIG. 6 illustrates a telecommunications system 100 in accordance with a further embodiment of the present. Generally, in this embodiment a digital subscriber line (DSL) communication protocol is used in conjunction with the PSTN to provide simultaneous transfer of voice information and cookie files. The DSL protocol can be either asymmetrical or symmetrical. The PSTN 106 carries voice information, while the WAN 108 can carry digitized cookie files. The system 100 includes a caller CPE 102, a caller local central office 104, a PSTN 106, a WAN 108, a called party local CO 110 and a called party CPE 112. Although depicted as video phones, the CPEs 102, 112 can be any terminal device adapted for using cookie files in accordance with the present invention, such as the CPEs 12, 24 of FIG. 1. The CPEs 102, 112 can include asymmetrical digital subscriber line (ADSL) modems permitting simultaneous voice and data communication therebetween. Information from the customer premises is transferred to the local COs 104, 110 over a conventional twisted pair analog local-loop.

The DSLAMs 118, 124 can be implemented using commercially available components such as the FastInternet™ DSLAM system, available from Orckit, Ltd., of Tel Aviv, Israel. Such a DSLAM can be interfaced directly to the WAN 108. The WAN 108 can be a conventional TCP/IP network, such as the global Internet, an asynchronous transfer mode (ATM) network, SONET, or the like.

Figure 7:
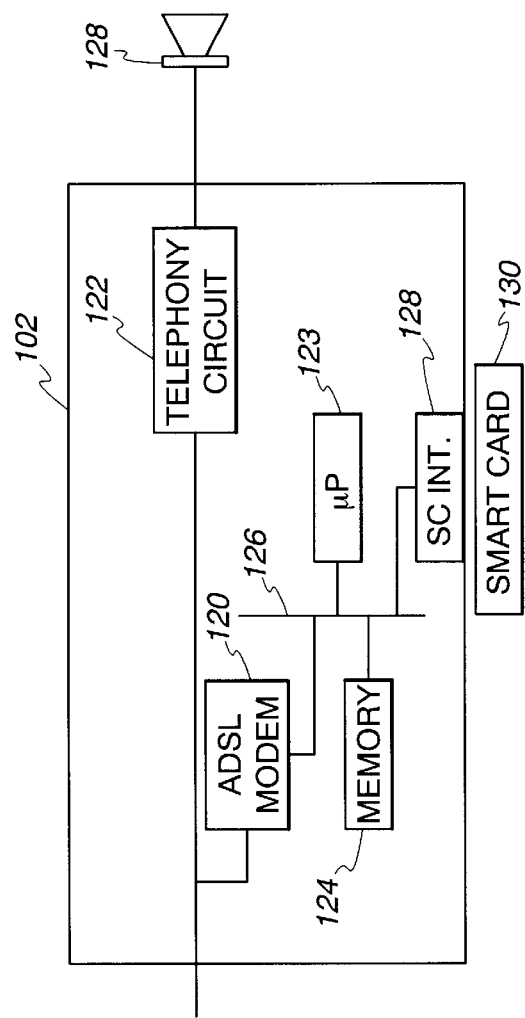
FIG. 7 is a detailed block diagram illustrating the caller CPE shown in FIG. 6.

FIG. 7 illustrates a detailed block diagram of the caller CPE 102 shown in FIG. 6. The CPE 102 can include an asymmetrical digital subscriber line (ADSL) modem 120, conventional analog telephone circuit 122, a microprocessor 123 and a memory 124. The ADSL modem 120, memory 124, and microprocessor 123 communicate via a conventional microprocessor bus 126, such as PCI bus. Analog signals representing DSL data and voice are received over the local-loop by the ADSL modem 120 and analog telephone circuit 122. The ADSL modem 120 converts incoming signals to digital data signals that can represent the cookie files, while the analog telephone circuit 122 is responsive to voice signals.

The ADSL modem 120 can be implemented using a commercially available ADSL modem operating in conformity with the Universal ADSL Workgroup (UAWG) standard G.992.2, customarily known as G.Lite.

Alternately, a symmetrical DSL modem can be used in place of the ADSL modem. As one of ordinary skill in the art will readily appreciate, in such an arrangement, splitters are typically included in the CPEs and COs to filter data signals and voice.

The telephony circuit 122 can provide the same functionality as described earlier for the telephone circuit 68 of FIG. 3.

Figure 8:
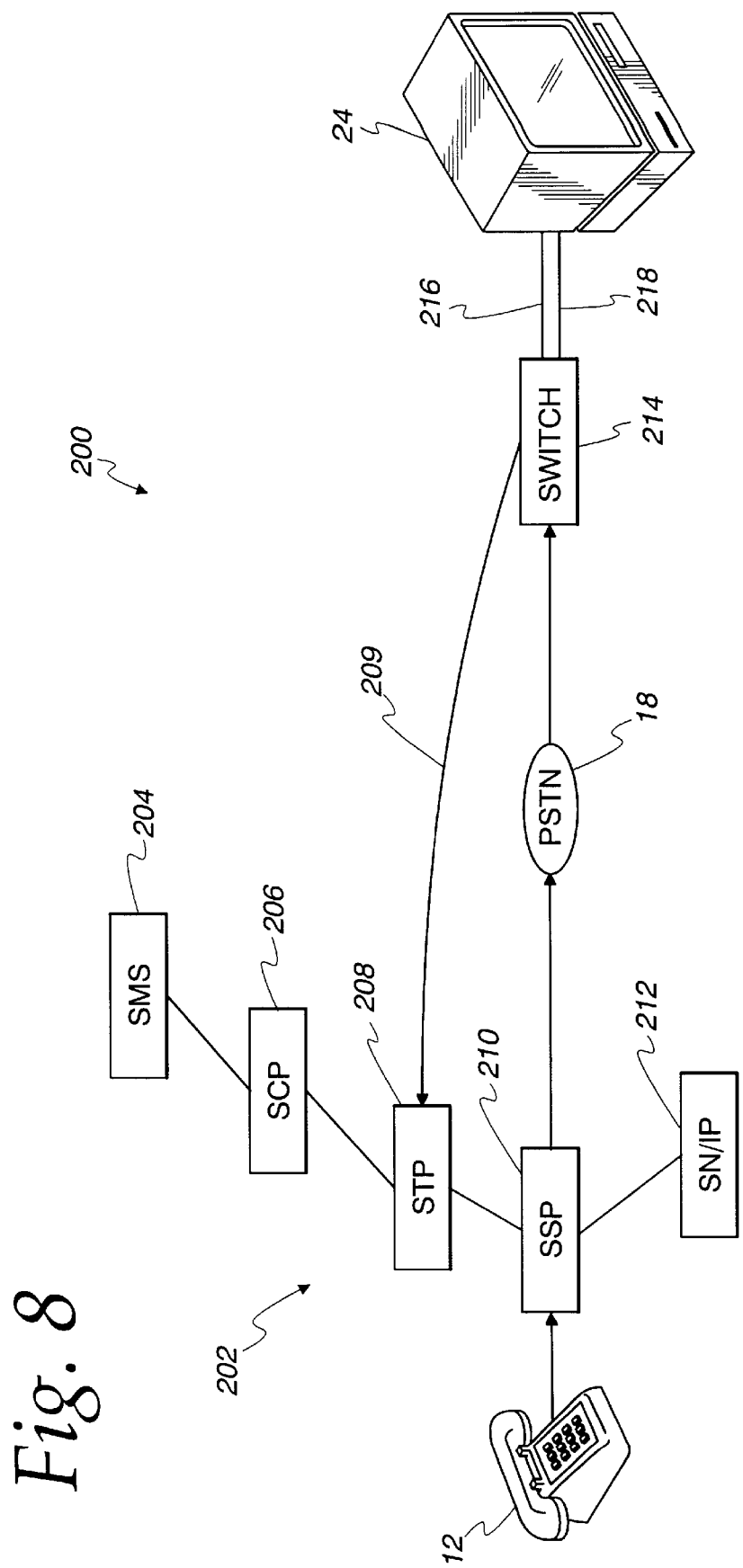
FIG. 8 is a block diagram illustrating a telecommunications system in accordance with another embodiment of the present invention.

FIG. 8 illustrates a block diagram of a telecommunications system 200 in accordance with another embodiment of the present invention. The system 200 includes an advanced intelligent network (AIN) 202, the caller CPE 12, the PSTN 18, a telecommunications switch 214, and the called party CPE 24. A first telephone line 216 and a second telephone line 218 permit simultaneous calls at the called party CPE 24.

The AIN 202 includes a service management system (SMS) 204, a switching control point (SCP) 206, a signal transfer point (STP) 208, a switching service point (SSP) 210, and a service node/intelligent peripheral (SN/IP) 212. The AIN uses common channel signalling (CCS) for communication between the SMS, SCP, STP, and SSP. CCS is an out-of-band signalling method that utilizes packet-switched networking to allow messages to be transported on a dedicated high-speed data network, separate from the subscriber voice and data communications path. The CCS utilizes the Signalling System No. 7 (SS7) protocol to send messages between the AIN elements regarding call setup, line status, caller identification, and other network services, including AIN inquiries. The use of SS7 in an AIN is well known to those skilled in the art. Also, as is known in the art, the SN/IP 212 and SSP 210 can communicate using an integrated services digital network (ISDN) interface.

AIN elements, suitable for implementing an embodiment of the present invention are commercially available from several vendors and are known to those skilled in the art. For example, the functionality of the SSP 210, as disclosed herein, can be implemented using any AIN compatible switch, such as a 5ESS switch, available from Lucent Technologies, Inc.; the SN/IP 212 can be implemented using a Compact Service Node, available from Lucent Technologies, Inc.; and the STP 208 can be implemented using an STP available from Nortel, Inc.

In the system 200, data files containing information tokens can be stored within the AIN 202 rather than at the caller CPE 12. Retrieval and storage of cookie files stored within the AIN 202 can be accomplished as follows. A caller can initiate a call to the called party CPE 24 from the caller CPE 12. The call is routed by the SSP 212 to the remote switch 214 via the PSTN 18. The called party CPE 24 receives the incoming call over line 216. During call setup, caller identification information can be transferred from the SSP 210 to the called party CPE 24. The caller information can include a 10-digit phone number identifying the caller CPE 12.

During the ensuing conversation between the caller CPE 12 and called party CPE 24, the CPE 24 can place a second call over line 218 to access a cookie file stored within the AIN 202. The second call is routed by the switch 214 to the SSP 210 via the PSTN 18. The SSP 210 then connects the call to the SN/IP 212. The SN/IP 212 can include a modem for communicating with the CPE 24. During this second call, the caller information about the caller CPE 12 is provided to SN/IP 212, which in turn sends a message to the SCP 206 requesting the retrieval of a cookie file corresponding to the caller information and any other parameters included by the called CPE 24.

Service logic within the SCP 206 accesses a database of cookie files according to the information received from the SN/IP 212. The database can be included locally within the SCP 206, or elsewhere within the AIN 202, such as in the SN/IP 212. After retrieving the requested cookie file, the SCP 206 returns the information to the SSP 210 in a message. The SN/IP 212, transfers this message, using a modem, to the called party CPE 24 via the PSTN 18, switch 214 and second line 218.

In an alternative arrangement, the CPE 24 can communicate with the switch 214 using an ISDN interface. In this arrangement, voice data can be carried on the bearer channel of the ISDN connection, while cookie retrieval signalling can be carried on the signalling channel of the ISDN. This permits simultaneous voice and data transfer to/from the CPE 24. The CPE 24 can be adapted to transmit SS7 messages via the ISDN interface. These messages can be directly passed from the switch 214 to the STP 208 over SS7 link 209. The SS7 messages can contain caller information and information about CPE 24 for retrieving a cookie file from the SCP 206 specific to the CPE 24 and the particular caller. Upon receiving the message, the STP 208 forwards the request to the SCP 206. In response, the SCP 206 returns a cookie file to the CPE 24 using the SS7 channel.

In another arrangement, the CPE 24 can be adapted to directly communicate with the STP 208. In this case, the CPE 24 can use an SS7 channel (not shown) to directly send a cookie request to the STP 208, bypassing the switch 214.

Upon receiving the cookie file, the CPE 24 can modify the contents thereof and return the modified file to the SCP database in a manner similar to that used to originally retrieve the file.

The CPEs disclosed herein represent examples of specific embodiments of the present invention. Accordingly, it will be apparent to one of ordinary skill in the art that the CPEs can be equivalently implemented using hardware components only, software components only, or any combination of hardware and software components. For example, the functionality of the CPEs can be implemented using one or more application specific integrated circuits (ASICs), designed or configured to perform the CPE functions as disclosed herein. Alternatively, the CPE functionalities can be implemented using a combination of discrete analog and digital hardware components.

In addition, the CPEs can be configured to accept an article of manufacture, such as a computer-readable storage medium that contains software components in accordance with the present invention.

In sum, there has been disclosed herein a system and method that permits data files to be used with telephonic customer premises equipment (CPE). Because the method and system as disclosed herein can include CPEs capable of storing and transferring cookie files, it reduces the burden of maintaining customer profiles at dial-up service centers. Moreover, since profiles can be stored in CPEs at the caller's premises, the callers can readily update their profiles to maintain data integrity.

Obviously, many modifications and variations of the present invention are possible in light of the above teachings. Thus, it is to be understood that, within the scope of the appended claims, the invention may be practiced otherwise than as specifically described above.

What is claimed is:

1. In a communication network, a system comprising:
  a communications network;
  a first customer premises equipment (CPE) in communication with said communications network, said first CPE including means for storing at least one data file including caller profile information; and
  a second CPE in communication with said communication network, said second CPE including means for electronically requesting said one data file from said first CPE, said second CPE receiving said data file via the communications network in response the request, electronically modifying said data in response to an electronic request and transferring the modified data file to said first CPE for storage therein.

2. The system as recited in claim 1, wherein said communications network is a voice and data communications network and includes two or more voice-over-data (VOD) modems operatively coupled to the communications network.

3. The system as recited in claim 1, wherein said communications network includes one or more central office (CO) switches.

4. The system as recited in claim 3, wherein said communication network includes a public switched telephone network (PSTN).

5. The system as recited in claim 1, wherein said first CPE and said second CPE are operatively coupled to a digital subscriber line (DSL) modem.

6. The system as recited in claim 5, wherein said communications network includes two or more digital subscriber line access multiplexers (DSLAM) digital subscriber line access multiplexer (DSLAM).

7. The system as recited in claim 6, wherein said communications network includes two or more telecommunication switches operatively coupled to a public switch telephone network (PSTN).

8. The system as recited in claim 6, further including a wide area network (WAN) which provides a communication path between said DSLAMs.

9. The system as recited in claim 1, wherein said data file is a cookie file.

10. An intelligent telephone, comprising:
  means for receiving an electronic request for a called party for a data file including caller profile information;
  means for enabling voice and data communications; said enabling means including means for simultaneously transferring the data file and voice over a telecommunications network to the called party in response to the request;
  means for receiving a modified data file corresponding to the transferred file from the called party; and
  means for storing the modified data file.

11. The intelligent telephone of claim 10, wherein the transferring means includes a modem.

12. The intelligent telephone of claim 11, wherein the modem is a digital subscriber line modem.

13. The intelligent telephone of claim 10, further including a smartcard reader capable of storing the modified data file on a smartcard.

14. An intelligent telephone, comprising:

a bus;

a memory, operatively coupled to the bus, for storing at least one data file including caller profile information;

a microprocessor operatively coupled to the bus;

an interface capable of being operatively coupled to a telecommunications network;

a modem, operatively coupled to the interface and the bus, said modem for transferring the at least one data file to the telecommunications network via the interface simultaneously with voice data;

means for responding to an electronic request for a data file;

a telephony circuit, in communication with the interface, for generating signals representing voice; and a software program routine, executable by the microprocessor, for causing the requested data file to be transferred from the memory to the modem in response to said electronic request received from a called party.

15. The intelligent telephone of claim 14, wherein the modem is a symmetrical digital subscriber line (ADSL) modem.

16. The intelligent telephone of claim 14, further including a smartcard interface in communication with the bus capable of storing the at least one data file on a smartcard.

17. A method of transferring an information token file between a caller customer premises equipment (CPE) and a called party CPE, comprising:

establishing a telephone conversation between the called party CPE and the caller CPE;

establishing a data connection between the called party CPE and the caller CPE during the telephone conversation;

electronically modifying the information token file in response to data communications between said caller CPE and said called party CPE to produce a modified token information file;

transferring the modified token information file to the caller CPE; and storing the modified token information file in the caller CPE.

18. The method of claim 17, wherein the caller CPE includes an intelligent telephone.

19. The method of claim 17, where the called party CPE includes a call service center.

20. A telecommunication system, comprising:

a caller customer premises equipment (CPE) for storing at least one data file including a caller profile;

a first modem, operatively coupled to the caller CPE, for permitting simultaneous voice and data communications;

a communication network operatively coupled to the first modem;

a second modem, operatively coupled to the communication network, for permitting simultaneous voice and data communications; and a called party CPE, operatively coupled to the second modem, including means for accessing that at least one data file by submitting an electronic request to the caller CPE, during a voice conversation, to transfer the at least one data file.

* * * * *